(12) United States Patent
Kalafut et al.

(10) Patent No.: US 6,418,364 B1
(45) Date of Patent: Jul. 9, 2002

(54) METHOD FOR DETERMINING A POSITION AND HEADING OF A WORK MACHINE

(75) Inventors: James J. Kalafut, Peoria; Jeffrey S. Alig, Morton, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/736,901

(22) Filed: Dec. 13, 2000

(51) Int. Cl.[7] .............................. G06F 19/00; E02F 5/02
(52) U.S. Cl. .............................. 701/50; 172/2; 37/414; 37/348
(58) Field of Search ..................... 701/50, 207; 172/2, 172/3, 4, 4.5; 37/348, 382, 414, 415, 416

(56) References Cited

U.S. PATENT DOCUMENTS

| | | | |
|---|---|---|---|
| 5,438,771 A | | 8/1995 | Sahm et al. |
| 5,806,016 A | * | 9/1998 | Henderson et al. ......... 701/207 |
| 5,848,485 A | * | 12/1998 | Anderson et al. ............ 37/348 |
| 5,925,085 A | * | 7/1999 | Kleimenhagen et al. ...... 701/50 |
| 5,951,613 A | * | 9/1999 | Sahm et al. ................... 701/50 |
| 5,987,371 A | * | 11/1999 | Bailey et al. ................ 701/207 |
| 6,028,524 A | * | 2/2000 | Hartman et al. ............. 172/4.5 |
| 6,062,317 A | * | 5/2000 | Gharsalli et al. ............... 172/2 |
| 6,141,612 A | * | 10/2000 | Flamme et al. ................ 701/50 |
| 6,317,669 B1 | * | 11/2001 | Kurenuma et al. ............ 701/50 |

* cited by examiner

*Primary Examiner*—Gary Chin
(74) *Attorney, Agent, or Firm*—S. D. Lundquist

(57) ABSTRACT

A method for determining a position and a heading of a work machine having a work implement controllably attached. The method includes the steps of positioning the work machine at a desired work location, determining an initial position and heading of the work machine in site coordinates, determining a position of the work implement relative to the work machine, positioning the work implement at a desired reference point, determining the position of the work implement at the reference point in site coordinates, periodically positioning the work implement at the reference point during work operations, and determining a new position and heading of the work machine as a function of the position of the work implement relative to the work machine.

7 Claims, 4 Drawing Sheets

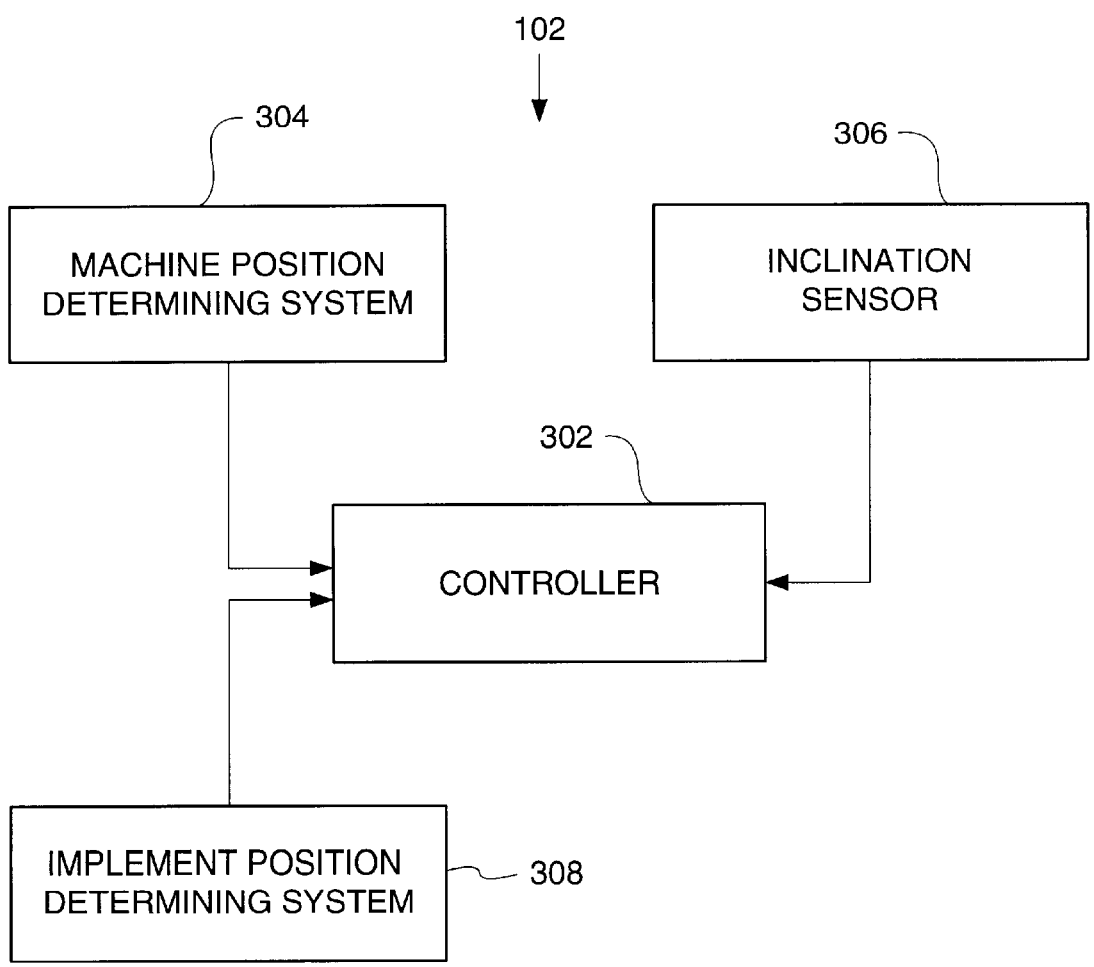

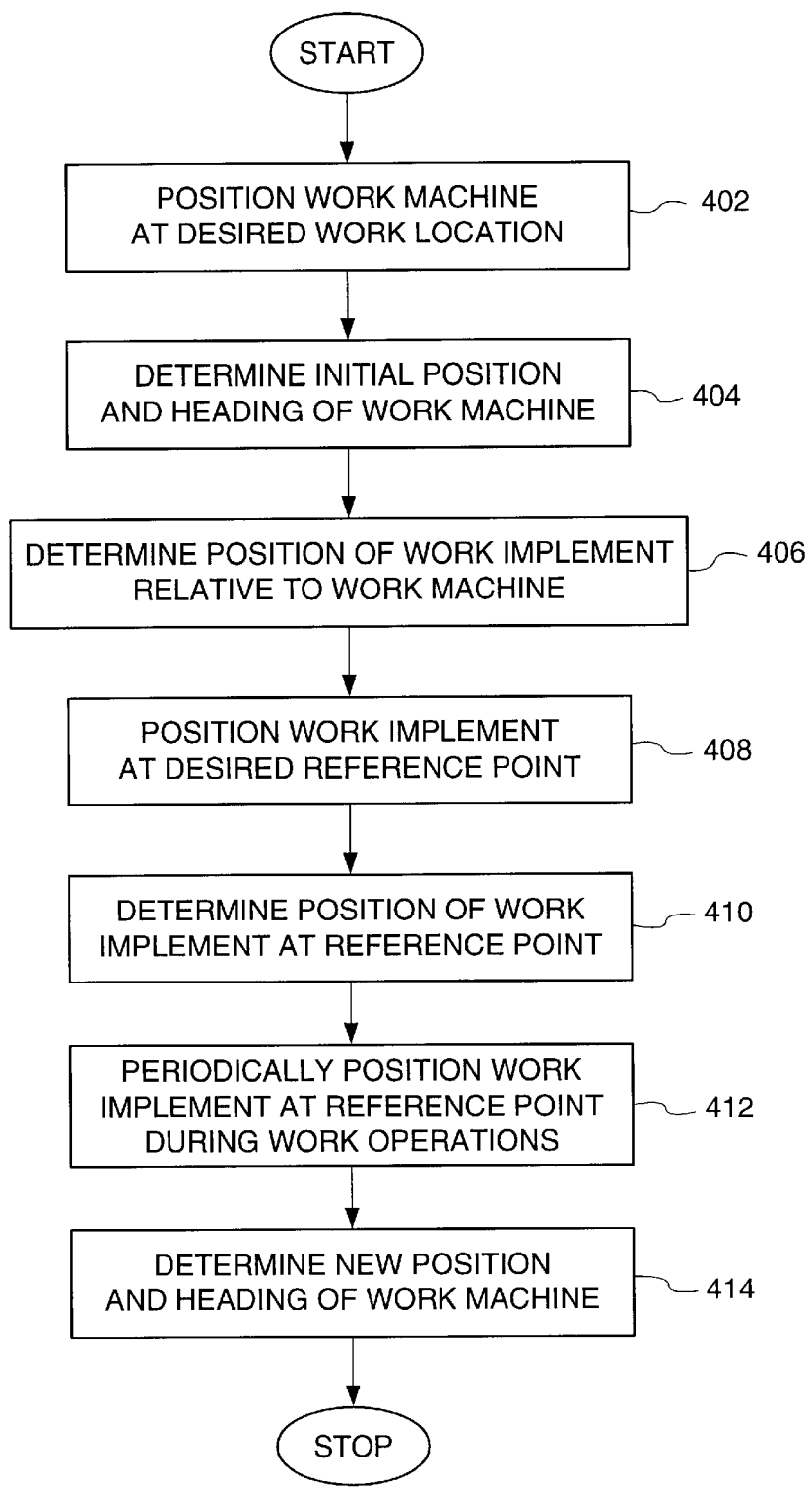

METHOD FOR DETERMINING A POSITION AND HEADING OF A WORK MACHINE

TECHNICAL FIELD

This invention relates generally to a method for determining a position and heading of a work machine at a work location and, more particularly, to a method for periodically checking the position and heading of the work machine by comparing with a known reference point.

BACKGROUND ART

Work operations which require the use of work machines, for example, earthworking operations requiring earthworking machines, must be performed with some degree of accuracy. However, the power required to perform the work, and the inherent harshness of the work environment, often make accuracy difficult to achieve. For example, it is often desired to dig trenches and the like using a work machine such as a backhoe loader. The backhoe loader must frequently be moved as the trench is created. If the heading of the backhoe loader shifts during excavation, as is often the case during digging, the operator must be careful not to drift off the intended course and dig the trench along the wrong boundaries.

Furthermore, work machines are becoming increasingly dependent on advances in technology. For example, electrohydraulic work machines, such as the backhoe loader exemplified above, are increasingly automating many of the work functions that typically were performed by skilled operators. As an example, position and heading determining systems may be used to guide a work machine along an intended path. However, the harshness of the work environment, e.g., rocks, clay, and other obstructions in the soil, may shift the work machine off its determined heading, for example during trenching operations. Therefore, as the work machine moves to follow the trench line being created, the work machine may drift off its intended course, thus introducing errors in the excavation.

The present invention is directed to overcoming one or more of the problems as set forth above.

DISCLOSURE OF THE INVENTION

In one aspect of the present invention a method for determining a position and a heading of a work machine having a work implement controllably attached is disclosed. The method includes the steps of positioning the work machine at a desired work location, determining an initial position and heading of the work machine in site coordinates, determining a position of the work implement relative to the work machine, positioning the work implement at a desired reference point, determining the position of the work implement at the reference point in site coordinates, periodically positioning the work implement at the reference point during work operations, and determining a new position and heading of the work machine as a function of the position of the work implement relative to the work machine.

BRIEF DESCRIPTION OF THE DRAWINGS

FIG. 3 is a block diagram illustrated a preferred embodiment of the present invention; and FIG. 4 is a flow diagram illustrating a preferred method of the present invention.

BEST MODE CARRYING OUT THE INVENTION

Figure 1:
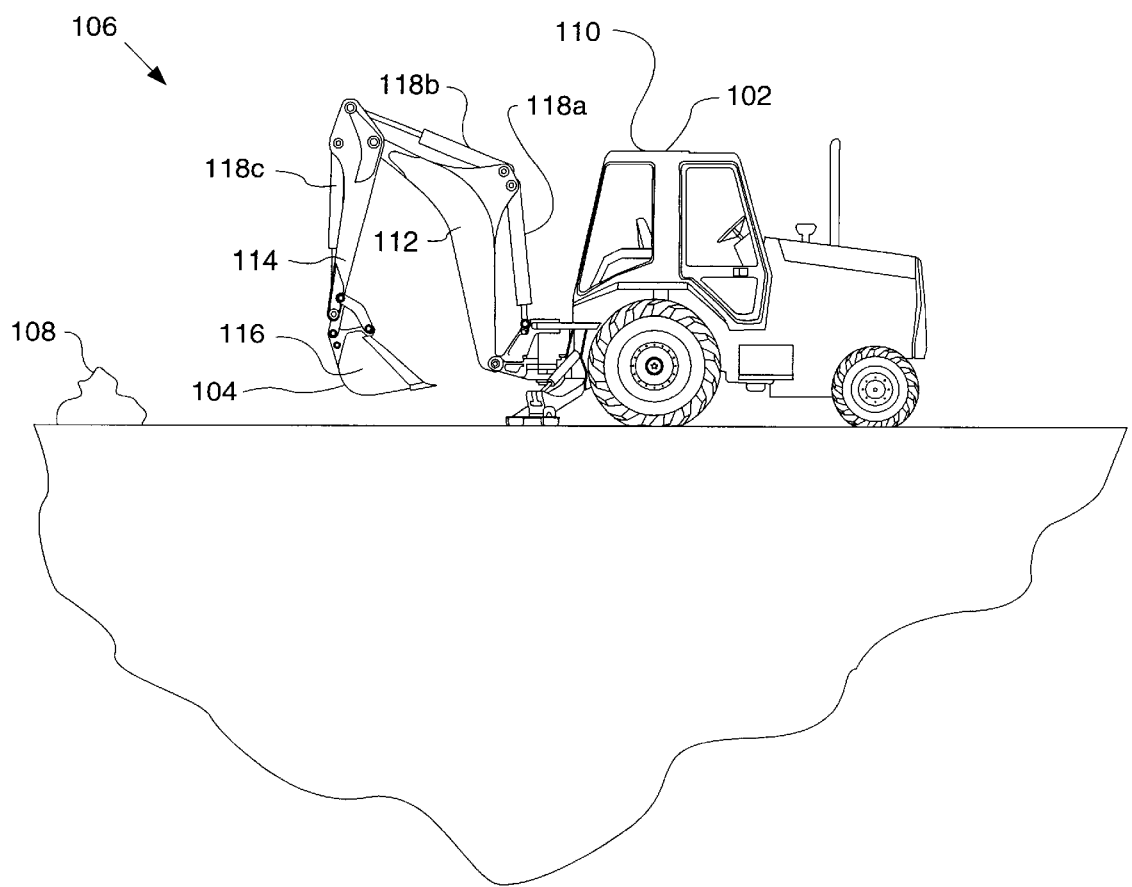
FIG. 1 is a diagrammatic illustration of a work machine at a work location.

Referring to the drawings, and with particular reference to FIG. 1, a work machine 102 at a work location 106 is shown. Preferably, the work machine 102 has a work implement 104 controllably attached.

The work machine 102 in FIG. 1 is shown as an earthworking machine 110, in this example a backhoe loader. However, other types of work machines may be used in the present invention, for example, excavators, front shovels, trenchers, and the like.

In the preferred embodiment, the work implement 104 is a bucket 116. However, other types of work implements, e.g., blades, boring tools, rippers, and the like, may be used as well. Preferably, the bucket 116 is attached to the work machine 102 by at least one linkage, for example, a boom 112 and a stick 114, as is commonly used with earthworking machines of the type depicted in FIG. 1.

A reference point 108, shown in FIG. 1, is used to provide a reference for a position and a heading of the work machine 102, as is discussed in more detail below. In the preferred embodiment, the reference point 108 is a point that is easily recognizable by an operator of the work machine 102, is not likely to be moved from its present position at the work location 106, and may readily be referred to by the operator at periodic intervals. Examples of suitable reference points include, but are not limited to, rocks, flags, markers, trees, and the like.

Referring to FIG. 3, a block diagram illustrating a preferred embodiment of the present invention is shown. A controller 302, preferably located on the work machine 102, is adapted to receive information from various sensors and systems, and responsively determine a position and heading of the work machine 102.

A machine position determining system 304, located on the work machine 102, is adapted to determine the position of the work machine 102, preferably in site coordinates, i.e., with reference to a coordinate system relative to the work location 106. A suitable example of a coordinate system is a Cartesian coordinate system having x,y,z coordinates. However, other types of coordinate systems, e.g., latitude and longitude with respect to a fixed point, polar coordinates, and the like may be used as well. In the preferred embodiment, the machine position determining system 304 includes a global position satellite (GPS) system. However, other types of positioning systems, e.g., laser referencing, dead reckoning, and the like, may be used.

Figure 2:
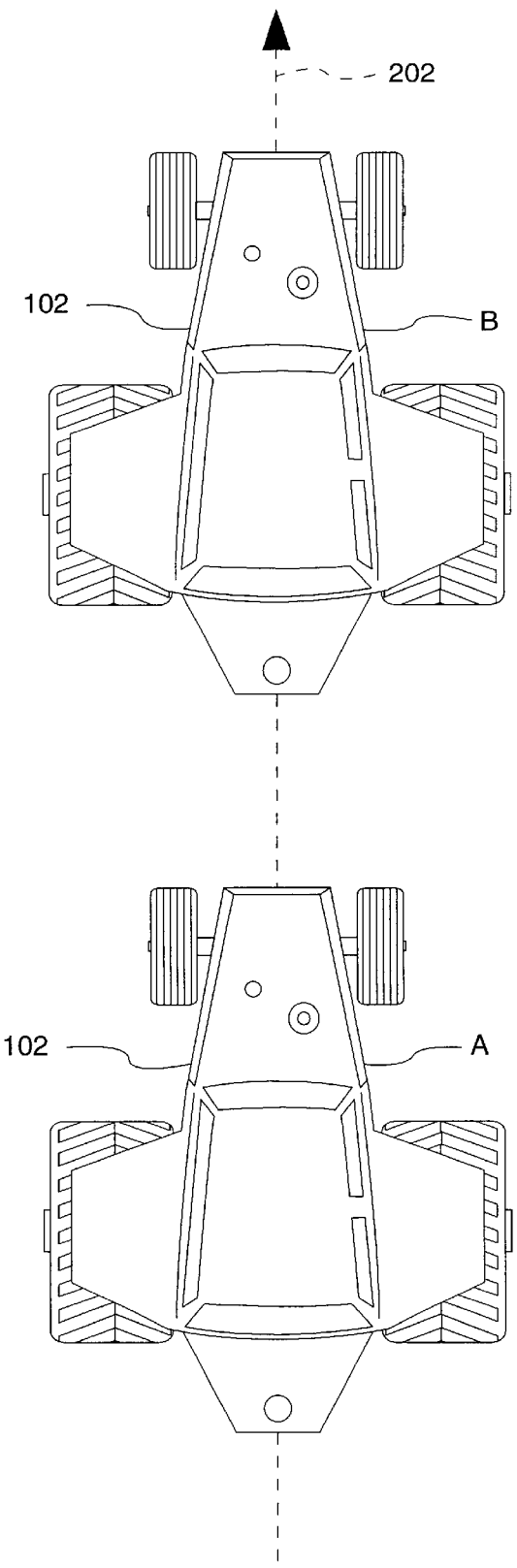
FIG. 2 is a diagrammatic illustration of a work machine traveling to a work location.

With reference to FIG. 2, an example of a technique for determining an initial position and heading of a work machine 102 is shown. The technique requires a plurality of position determinations of the work machine 102, for example, at position A and position B. The position of the work machine 102 at each position is determined. From the plurality of position determinations, a line 202 indicating a direction of travel is determined. The line 202 provides an indication of an initial heading of the work machine 102. It is understood that, although only two positions A and B are shown, the plurality of positions may be of any number desired to determine the initial position and heading of the work machine 102 as the work machine 102 approaches the desired work location 106.

The initial heading determination must be made as the work machine 102 travels to the desired work location 106.

A heading cannot be obtained by this method when the work machine 102 is not moving, e.g., when the work machine 102 stops and is positioned to perform work operations. A system to allow the determination of heading when a work machine 102 is not moving would require more elaborate, and thus more costly, sensors and systems. For example, the use of two GPS antennas would allow heading determination while the work machine 102 is not moving, but would be more costly. The present invention, therefore, as described more fully below, is advantageous with work machines that use one machine position determining system 304 of the type described above.

An inclination sensor 306, located on the work machine 102, is used to determine an angle of inclination of the work machine 102, for example, pitch (fore and aft inclination) and roll (side to side inclination). The inclination sensor 306 is preferably of a type that is well known in the art, such as a gyro.

An implement position determining system 308, located on the work machine 102, is adapted to determine the position of the work implement 104 relative to the work machine 102. For example, the boom 112, stick 114, and bucket 116 of FIG. 1 may have a plurality of angular sensors, at least one located at each connecting joint, to sense an angular position of each linkage with respect to each adjacent linkage. For example, the angle of the boom 112 with respect to the work machine 102 may be sensed, the angle of the stick 114 with respect to the boom 112 may be sensed, and the angle of the bucket 116 with respect to the stick 114 may be sensed. These sensed angles are then delivered to the controller 302 to determine the position of the bucket 116 with respect to a known fixed point on the work machine 102. The above described technique for determining the position of a work implement 104 with respect to a work machine 102 is well known in the art and will not be discussed further.

Referring to FIG. 4, a flow diagram illustrating a preferred method of the present invention is shown.

In a first control block 402, the work machine 102 is positioned at the desired work location 106. For example, an earthworking machine 110, such as the backhoe loader depicted in FIG. 1, is driven to the work location 106, and positioned there to perform excavating operations. Typically, an earthworking machine 110 is prepared for excavating by stabilizing the excavating machine 110 using stabilizers (not shown) which help to hold the earthworking machine 110 in a fixed position as excavation takes place. However, the loading placed upon the work implement 104 tends to cause the earthworking machine 110 to shift about its position, thus creating a need for the present invention, as discussed below.

In a second control block 404, the initial position and heading of the work machine 102 is determined, preferably by a method comparable to the one described above with reference to FIG. 2.

In a third control block 406, the position of the work implement 104 relative to the work machine 102 is determined. Preferably, the position of the work implement 104 is determined by a method such as or similar to the above-described use of the implement position determining system 308. Alternatively, the use of cylinder position sensors (not shown) to sense the position of a plurality of hydraulic cylinders 118a,b,c may be used, the hydraulic cylinders 118a,b,c being used to control the positions of the boom 112, stick 114, and bucket 116. The use of cylinder position sensors to sense the position of hydraulic cylinders is well known in the art and will not be discussed further.

In a fourth control block 408, the work implement 104 is positioned at the desired reference point 108, preferably by the operator of the work machine 102 moving the work implement 104 to the reference point 108 until the work implement 104 touches the reference point 108.

The position of the work implement 104 in site coordinates at the reference point 108 is then determined in a fifth control block 410. The site coordinates of the reference point 108 then become a calibration point for future use, since the reference point 108 is fixed, and therefore, the site coordinates of the reference point 108 do not change.

In a sixth control block 412, the work implement 104 is periodically positioned at the reference point 108 during work operations, and a new position and heading of the work machine 102 is determined, in a seventh control block 414, as a function of the position of the work implement 104 relative to the work machine 102. Alternatively, the new position of the work machine 102 may be determined by the machine position determining system 304 and the new heading of the work machine 102 may be determined as a function of the position of the work implement 104 relative to the work machine 102.

In one embodiment, the work implement 104 is positioned at the reference point 108 in response to the work machine 102 knowingly moving from the initial position and heading, for example, by shifting during a heavily loaded work cycle. In another embodiment, the operator of the work machine 102 periodically positions the work implement 104 at the reference point 108 to calibrate the position and heading of the work machine 102 as a routine part of the work procedure. In yet another embodiment, the work implement 104 is positioned at the reference point 108 for calibration of position and heading prior to moving the work machine 102 from its fixed position to a next work position. A combination of the above embodiments may be employed for use in the present invention.

Industrial Applicability

As an example of the present invention in use, a backhoe loader is commonly used to dig trenches and holes for various purposes. A backhoe loader is a relatively light-weight machine, and thus is subject to shifting about from its initial position and heading as the bucket of the loader encounters heavy loads, such as boulders, clay deposits, tree roots, and the like.

In modern electro-hydraulic systems used by an increasing number of backhoe loaders, it is desired to automate some of the features that previously were performed by skilled operators, although with some difficulty at times. For example, when digging a trench, the backhoe loader is stabilized at a first position and heading, and is then moved slightly as the trenching progresses. Automating this process, using modern position determining technology, helps to maintain trenching operations along a desired path. However, as the heading of the backhoe loader is changed due to undesired shifts in position, movement of the backhoe loader tends to drift off course. With the present invention, however, undesired changes in position and heading are accounted for by periodic calibration, and the backhoe loader stays on the desired path.

Other aspects, objects, and features of the present invention can be obtained from a study of the drawings, the disclosure, and the appended claims.

What is claimed is:

1. A method for determining a position and a heading of a work machine having a work implement controllably attached, including the steps of:

positioning the work machine at a desired work location;

determining an initial position and heading of the work machine in site coordinates;

determining a position of the work implement relative to the work machine;

positioning the work implement at a desired reference point;

determining the position of the work implement at the reference point in site coordinates;

periodically positioning the work implement at the reference point during work operations; and determining a new position and heading of the work machine as a function of the position of the work implement relative to the work machine.

2. A method, as set forth in claim 1, wherein determining an initial position and heading of the work machine includes the steps of:

determining a plurality of positions of the work machine in site coordinates as the work machine approaches the desired work location; and determining the initial position and heading of the work machine at the desired work location as a function of the plurality of determined positions.

3. A method, as set forth in claim 1, wherein determining a position of the work implement relative to the work machine includes the step of sensing an angular position of at least one linkage connecting the work implement to the work machine.

4. A method, as set forth in claim 1, wherein positioning the work implement at a desired reference point includes the step of moving the work implement to a point near the work location that provides a reference in fixed site coordinates, the desired reference point being adapted to remain fixed and accessible during work operations.

5. A method, as set forth in claim 1, wherein periodically positioning the work implement at the reference point includes the step of positioning the work implement at the reference point in response to the work machine moving from the initial position and heading.

6. A method, as set forth in claim 1, wherein periodically positioning the work implement at the reference point is performed by an operator of the work machine to periodically calibrate the position and heading of the work machine.

7. A method, as set forth in claim 2, wherein determining an initial position and heading further includes determining an angle of inclination of the work machine.

* * * * *